(12) United States Patent
King et al.

(10) Patent No.: US 11,624,722 B2
(45) Date of Patent: Apr. 11, 2023

(54) METHOD AND SYSTEMS FOR DETERMINING DIELECTRIC BREAKDOWN VOLTAGES OF FLUID SAMPLES USING DIELECTRIC FLUID TESTERS

(71) Applicant: The Boeing Company, Chicago, IL (US)

(72) Inventors: Garnel King, Madison, AL (US); Dennis Lynn Coad, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 260 days.

(21) Appl. No.: 16/858,423

(22) Filed: Apr. 24, 2020

(65) Prior Publication Data

US 2021/0333229 A1    Oct. 28, 2021

(51) Int. Cl.
  *G01N 27/22*     (2006.01)
  *G01N 27/06*     (2006.01)

(52) U.S. Cl.
  CPC .......... *G01N 27/221* (2013.01); *G01N 27/06* (2013.01); *G01N 27/226* (2013.01)

(58) Field of Classification Search
  CPC .... G01N 27/221; G01N 27/06; G01N 27/226; G01N 27/92
  See application file for complete search history.

(56) References Cited

U.S. PATENT DOCUMENTS

| | | | |
|---|---|---|---|
| 3,492,216 A | | 1/1970 | Riseman et al. |
| 4,392,110 A | * | 7/1983 | El-Menshawy .... G01R 27/2605 324/448 |
| 6,169,394 B1 | | 1/2001 | Frazier et al. |
| 7,210,343 B2 | | 5/2007 | Shammai et al. |
| 7,275,420 B2 | | 10/2007 | Discenzo |
| 7,972,487 B2 | | 7/2011 | Hyland et al. |
| 9,719,908 B1 | * | 8/2017 | Bauer ................. G01N 15/082 |
| 2010/0038220 A1 | * | 2/2010 | Lindsey ............... H01H 9/0044 200/11 TC |

(Continued)

OTHER PUBLICATIONS

Standard Test Method for Dielectric Breakdown of Voltage of Insulating Oils of Petroleum Origin Using VDE Electrodes, American Society for Testing and Materials, 1984, 4 pgs.

*Primary Examiner* — Alvaro E Fortich
*Assistant Examiner* — Zannatul Ferdous
(74) *Attorney, Agent, or Firm* — Jordan IP Law, LLC

(57) ABSTRACT

Described herein are dielectric fluid testers for determining dielectric breakdown of fluid samples, systems comprising such testers, and methods using thereof. A dielectric fluid tester comprises a container and two electrodes. The test heads of these electrodes protrude inside the container and face each other, forming a gap. In some examples, one or both electrodes are movable for adjusting the gap and/or the volume inside the container available for a fluid sample. For example, the container includes two internal seals, one of which has a fixed position and is slidably coupled to a respective electrode. The other seal is slidably coupled to the container and moves together with the corresponding electrode. The container comprises an access port, providing a fluid communication between the fluid sample and an external pressure-controlling source. In some examples, the access port is used to deliver and remove the fluid sample from the container.

20 Claims, 11 Drawing Sheets

(56) References Cited

U.S. PATENT DOCUMENTS

| | | | |
|---|---|---|---|
| 2010/0050740 A1* | 3/2010 | Matsubara | G01N 27/4077 73/23.31 |
| 2016/0254108 A1* | 9/2016 | Curry | H04L 47/14 252/567 |
| 2019/0186963 A1* | 6/2019 | Oku | G01F 1/584 |
| 2020/0112016 A1* | 4/2020 | Erhart | H01M 50/20 |

* cited by examiner

*Fluid Sample Testing / Filling*

*Fluid Sample Discharge*

METHOD AND SYSTEMS FOR DETERMINING DIELECTRIC BREAKDOWN VOLTAGES OF FLUID SAMPLES USING DIELECTRIC FLUID TESTERS

BACKGROUND

Dielectric breakdown, which is also referred to as electrical breakdown, occurs when an electrical current passes through an insulator. The dielectric breakdown occurs when a sufficiently high voltage, which is referred to as a breakdown voltage, is applied across the insulator and the applied voltage exceeds the dielectric strength of the insulator. The dielectric strength, in turn, depends on various properties of the insulator, such as the composition (e.g., impurities), structure (e.g., density, morphology), temperature, pressure, and the like. Overall, dielectric breakdown is often used for material characterization of insulators.

Measuring the dielectric strength of fluids, which include both liquids and gases, has been challenging. One particular challenge involves the sample size or, more specifically, a relative large amount of the minimal sample size needed for dielectric breakdown testing. For example, a typical dielectric test for petroleum-based insulating oils (e.g., used in electrical transformers) requires a sample size of at least 0.2 liters to up to 1 liter. While transformer oils are easily available in such large quantities, many other types of fluids are not so abundant.

What is needed are new methods and systems for determining dielectric breakdown voltages of fluid samples and, in particular, small or micro fluid samples, such as fluid samples with a volume of less than about 100 milliliters.

SUMMARY

Described herein are dielectric fluid testers for determining dielectric breakdown of fluid samples, systems comprising such testers, and methods using thereof. A dielectric fluid tester comprises a container and two electrodes. The test heads of these electrodes protrude inside the container and face each other, forming a gap. In some examples, one or both electrodes are movable for adjusting the gap and/or the volume inside the container available for a fluid sample. For example, the container includes two internal seals, one of which has a fixed position and is slidably coupled to a respective electrode. The other seal is slidably coupled to the container and moves together with the corresponding electrode. The container comprises an access port, providing a fluid communication between the fluid sample and an external pressure-controlling source. In some examples, the access port is used to deliver and remove the fluid sample from the container.

A dielectric fluid tester for determining a dielectric breakdown voltage of a fluid sample is provided. In some examples, the dielectric fluid tester comprises a container, a first electrode, and a second electrode. The container is used for containing the fluid sample. The container comprises an insulating cap, a housing, and an access port. The access port is configured to connect to a pressure-controlling source and fluidically couple the pressure-controlling source to the fluid sample while the fluid sample is inside the container. The first electrode comprises a first test head and protruding into the container through the insulating cap. The second electrode comprises a second test head and protruding into the container. The first test head and the second test head face each other and are separated by a gap, forming a test zone within the container between the first test head and the second test head.

A method for detecting a dielectric breakdown voltage of a fluid sample using a dielectric fluid tester is provided. In some examples, the method comprises delivering the fluid sample into a container of the dielectric fluid tester. The container comprises an insulating cap, a housing, and an access port. The dielectric fluid tester comprises a first electrode, comprising a first test head, and a second electrode, comprising a second test head. In some examples, the method comprises applying a voltage between the first electrode and the second electrode and determining the dielectric breakdown voltage by at least one of: (a) adjusting a gap between the first test head and the second test head, (b) adjusting the voltage between the first electrode and the second electrode, (c) adjusting temperature of the fluid sample inside the container, or (d) adjusting pressure inside the container.

A system for determining a dielectric breakdown voltage of a fluid sample is provided. In some examples, the system comprises a dielectric fluid tester, a power supply, and a pressure-controlling source. The dielectric fluid tester comprises a container, a first electrode, comprising a first test head and protruding into the container, and a second electrode, comprising a second test head and protruding into the container. The first test head and the second test head face each other and are separated by a gap. The power supply is electrically coupled to each of the first electrode and the second electrode and configured to control a voltage applied between the first electrode and the second electrode. The pressure-controlling source is fluidically coupled to an interior of the container and configured to control pressure inside the container.

DETAILED DESCRIPTION

Figure 1A:
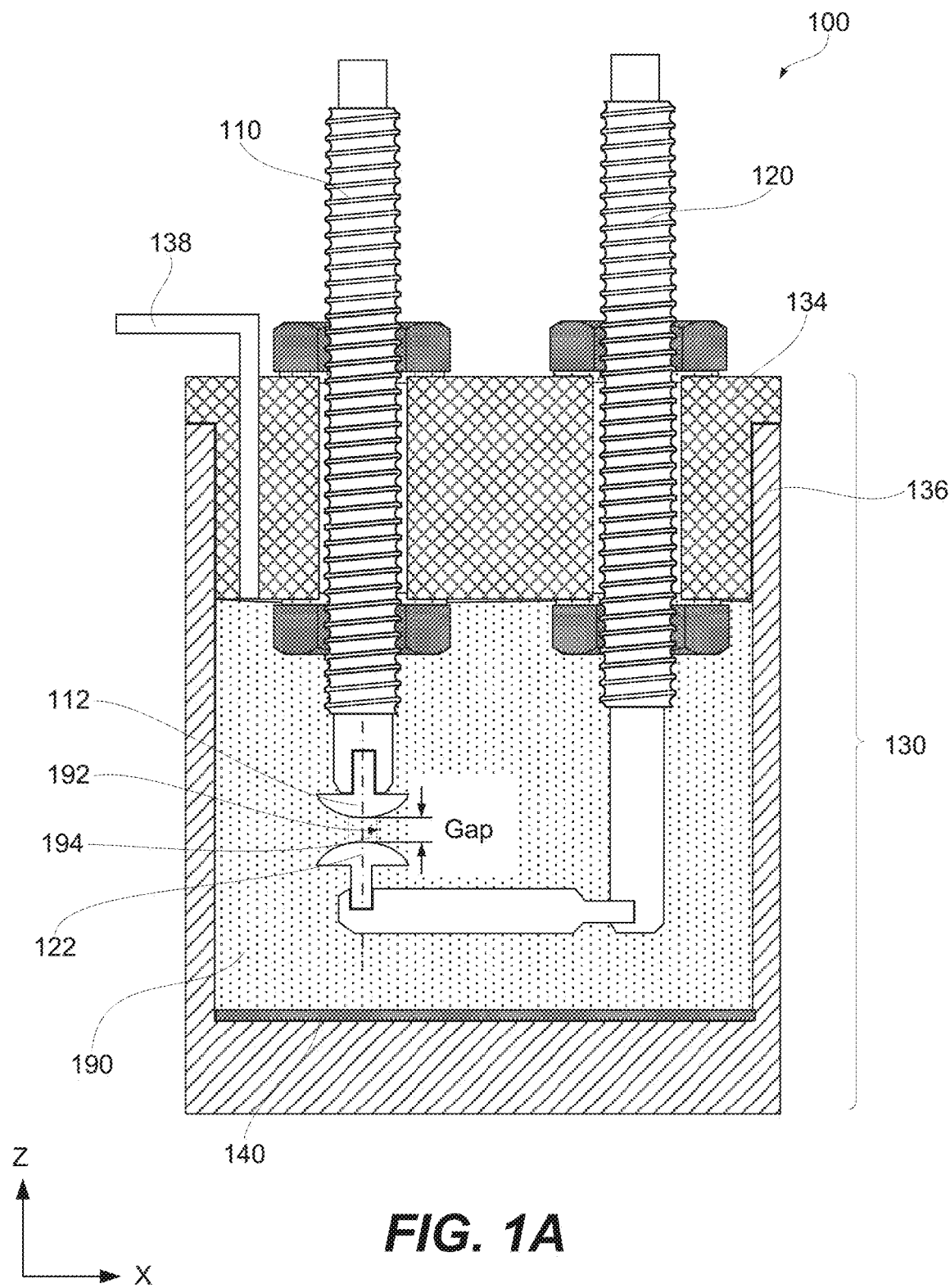
FIG. 1A is a schematic cross-sectional side view of a dielectric fluid tester, in accordance with some examples.

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Dielectric breakdown occurs when an electrical current passes through a fluid sample, which is liquid or gas. As noted above, the dielectric breakdown of a fluid sample or, more specifically, the dielectric strength of a sample depends on various properties of this sample, such as the composition (e.g., impurities, concentration), structure (e.g., density), temperature, pressure, and the like. Possible mechanisms for breakdown in liquids include bubbles, small impurities, and electrical super-heating. Furthermore, the breakdown process in liquids is complicated by hydrodynamic effects, since additional pressure is exerted on the fluid by the non-linear electrical field strength in the gap between the electrodes.

The dielectric strength is an important measure to withstand electric stresses without failure. When a voltage, applied to a fluid, exceeds the dielectric strength of this fluid, the fluid becomes electrically conductive for a brief moment allowing the electrical current to pass. The applied voltage drops, for this brief moment, as a result of this passing current. The electrical strength of the fluid is typically restored and the current flow stops. The dielectric breakdown voltage often indicates the presence of contaminants, such as water, dirt, cellulosic fibers, or conducting particles in a fluid.

Described fluid testers, systems, and methods allow determining dielectric breakdown of fluid samples having relative small or micro volumes, such as less than less than 100 milliliters, less than 50 milliliters, less than 20 milliliters, or even less than 10 milliliters. As noted above, conventional methods and systems typically require much larger sample sizes. As electric/electronic packages become smaller in size, micro-testing of fluids becomes more important. Specifically, as the equipment size continues to shrink in size, the amounts of fluid available for testing shrink in amount as well. At the same time, interactions with other materials will have an increasing effect on the dielectric capability of such materials.

Furthermore, these testers and methods open doors to understand the long term effect of materials on fluids in realistic operational condition, e.g., at volumes used in practical applications, rather than large volumes conveniently selected for testing purposes. This novel testing approach reduces testing and material costs because new materials do not need to be developed. Instead of replacing materials, current materials can be tested for dielectric breakdown to ensure stability in use. In addition, this novel approach opens up the use of dielectric fluids for use in micro-machines and high power microelectronics.

Dielectric Fluid Tester Examples

FIG. 1A is a schematic cross-sectional side view of dielectric fluid tester 100, in accordance with some examples. As noted above, dielectric fluid tester 100 is used for determining a dielectric breakdown voltage of fluid sample 190, which is also schematically shown in FIG. 1A. It should be noted that fluid sample 190 is a not a part of dielectric fluid tester 100, dielectric fluid tester 100 is filled with fluid sample 190 during testing of fluid sample 190. Dielectric fluid tester 100 allows testing very small or micro fluid samples, such as fluid sample 190 having a volume of less than 100 milliliters, less than 50 milliliters, less than 20 milliliters, or even less than 10 milliliters. As noted above, conventional dielectric tests usually require much larger sample sizes.

In some examples, dielectric fluid tester 100 comprises container 130, for containing fluid sample 190. Container 130 comprises insulating cap 134, housing 136, and access port 138. In more specific examples, e.g., shown in FIGS. 2A-2E, container 130 comprises additional insulating cap 135. Insulating cap 134 (in some examples, together with additional insulating cap 135) seals housing 136 such that the pressure inside container 130 is controllable, independently from the environmental pressure. Insulating cap 134 and, in some examples, additional insulating cap 135 are formed from any suitable insulating materials that prevent electrical current leakage through these components. Some examples of suitable materials for insulating cap 134 and/or additional insulating cap 135 include, but are not limited to plastics such as thermoplastics, synthetic polymers; rubbers such as thermoset rubbers, and the like; and other suitable materials. Specific examples include rubbers such as neoprene, nitrile, latex rubbers, silicone and silicone rubbers, butyl, and the like; thermoplastics such as polyamides such as nylon, fluorinated polymers such as polytetrafluoroethylene (PFA, e.g., TEFLON), polyvinylidene fluoride (PVDF, such as KYNAR and for example, KYNAR 500); acetal plastics such as polyoxymethylene (POM, such as DELRIN), polyoxyethylene, and the like; and other materials suitable for use as an insulating cap herein. In some examples, insulating cap 134 and/or additional insulating cap 135 come in contact with fluid sample 190 and, therefore, should be chemical resistant to the materials of fluid sample 190 and do not release any contaminants into fluid sample 190.

Some examples of suitable materials for housing 136 include, but are not limited to, glass, transparent plastics (e.g., polystyrene), and the like. In some embodiments, the container is transparent or sufficiently transparent so that the contact can be seen and used as a zero to set the electrode gap distance. Housing 136 comes in contact with fluid sample 190 and, therefore, should be chemical resistant to the materials of fluid sample 190 and do not release any contaminants into fluid sample 190. Furthermore, in some examples, housing 136 is transparent, which allows observing fluid sample 190 as well as position of various internal components of dielectric fluid tester 100 within container 130. For example, the fill volume, outgassing, and other characteristics of fluid sample 190 is observed through housing 136.

Figure 1B:
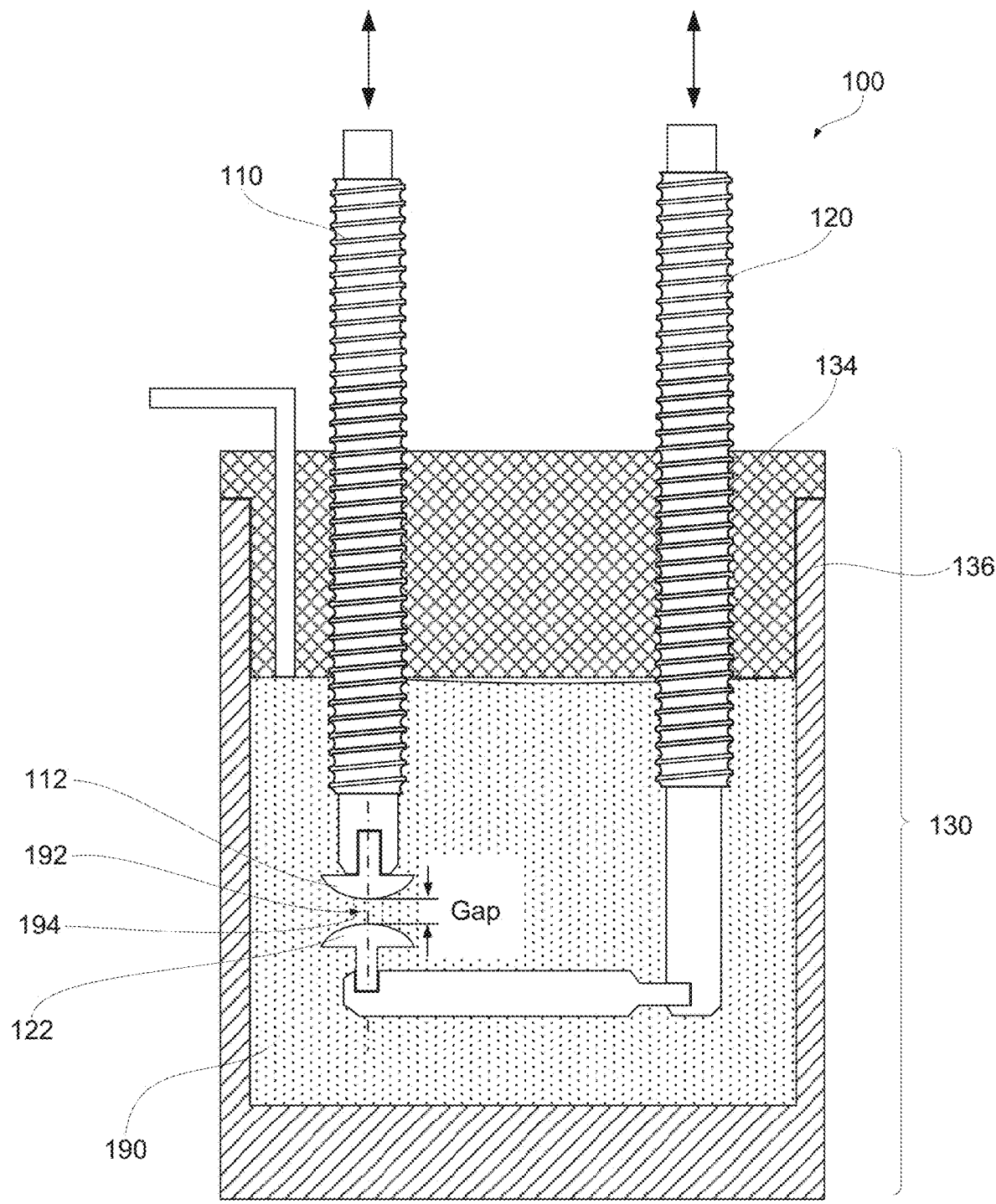
FIG. 1B is a schematic cross-sectional side view of a dielectric fluid tester, comprising movable electrodes, configured to change the gap between the test heads of these electrodes, in accordance with some examples.
Figure 1C:
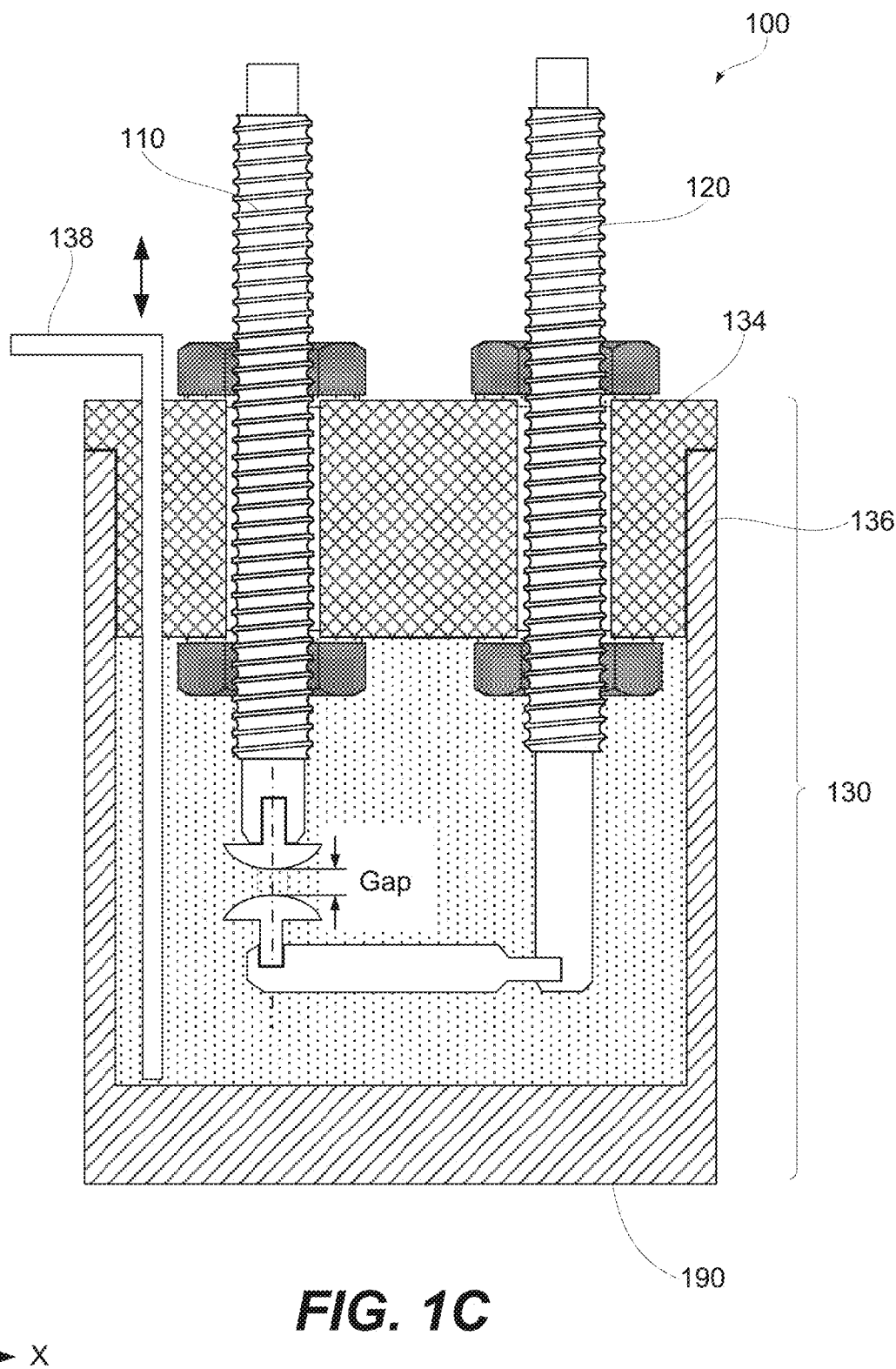
FIG. 1C is a schematic cross-sectional side view of a dielectric fluid tester, comprising an access port, movable relative to the container for outgassing a fluid sample as well as delivering and removing the fluid sample from the dielectric fluid tester, in accordance with some examples.
Figure 4:
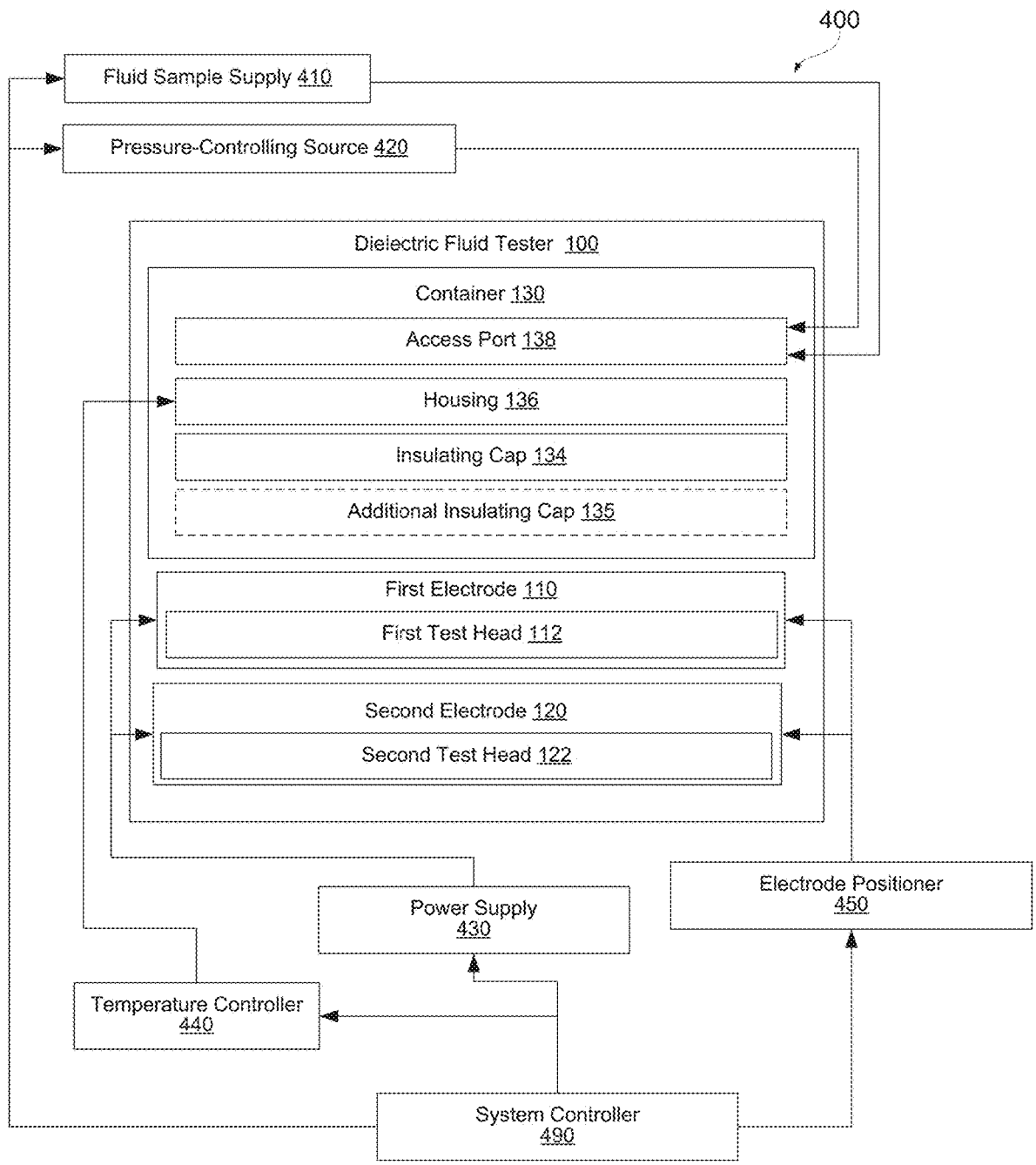
FIG. 4 is a schematic block diagram of a dielectric fluid testing system, comprising a dielectric fluid tester and various other components, providing different functionalities to the dielectric fluid tester, in accordance with some examples.

Access port 138 is configured to connect to pressure-controlling source 420 as described below with referenced to FIG. 4 showing an embodiment of the dielectric fluid testing system 400. More specifically, access port 138 is configured to fluidically couple pressure-controlling source 420 to fluid sample 190, while fluid sample 190 is inside container 130. For example, pressure-controlling source 420 is used for outgassing of fluid sample 190 and/or pressurizing of fluid sample 190, In some examples, access port 138 is selectively couplable to fluid sample supply 410, e.g., to supply fluid sample 190 to container 130 and/or remove fluid sample 190 from container 130 as further described below. In some examples, access port 138 is coupled to a multi-way valve to selectively and fluidly couple different components of system 400 to the interior of container 130. Furthermore, in some examples, access port 138 is movable relative to container 130. For example, access port 138 is lowered below the fluid level during removal of fluid sample 190 as, e.g., is schematically shown in FIG. 1C. In some examples, access port 138 is kept below the fluid level while filling container with fluid sample 190. Access port 138 is kept above the fluid level during outgassing fluid sample 190 as, e.g., is schematically shown in FIG. 1A.

In some examples, dielectric fluid tester 100 comprises first electrode 110 and second electrode 120. First electrode 110 protrudes into container 130 or, more specifically, partially protrudes into container 130, e.g., through insulating cap 134. First electrode 110 comprises first test head 112. During operation of dielectric fluid tester 100, first test head 112 is at least partially submerged into fluid sample 190. Similarly, second electrode 120 protrudes into container 130, e.g., through insulating cap 134 as shown in FIG. 1A-1C or through additional insulating cap 135 as shown in FIGS. 2A-2E. Second electrode 120 comprises second test head 122, During operation of dielectric fluid tester 100, second test head 122 is at least partially submerged into fluid sample 190. More specifically and with reference to FIG. 1A, first test head 112 and second test head 122 face each other and are separated by gap 192, forming test zone 194 within container 130 between first test head 112 and second test head 122.

Some examples of suitable materials for first electrode 110 and second electrode 120 include, but are not limited to, copper, stainless steel, brass, titanium, gold or gold plated, alloys thereof, and the like. First electrode 110 and second electrode 120 at least partially come in contact with fluid sample 190 and, therefore, should be chemical compatible with the materials of fluid sample 190 and does not release any contaminants into fluid sample 190.

FIGS. 3A-3F are schematic cross-sectional side views of different examples of electrode test heads, in accordance with some examples. The purpose of test heads is to precisely define a minimal distance between the two electrodes, which is referred to as gap 192. The electrical current passes through gap 192 during the dielectric breakdown of fluid sample 190. It should be noted that the breakdown voltage highly dependent of gap 192. Therefore, gap 192 needs to be precisely controlled, in part, by the shape of the electrode test heads.

Figure 2C:
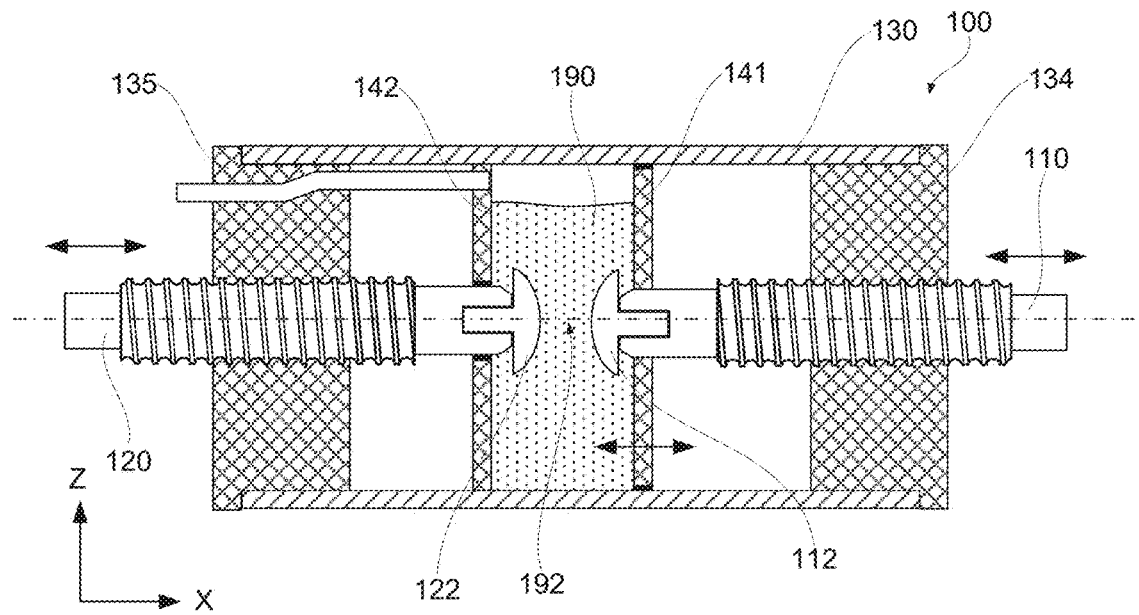
FIG. 2C is a schematic cross-sectional side view of a dielectric fluid tester, comprising two internal seals, such that one seal is movable relative to the container, while the other seal is fixed relative to the container, in accordance with some examples.
Figure 2D:
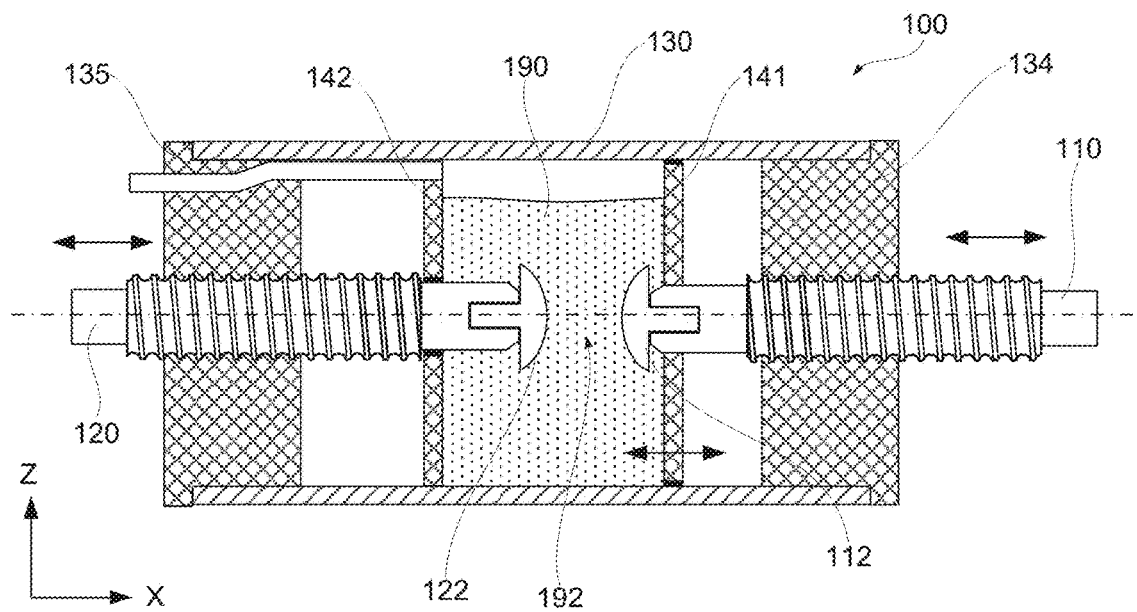
FIG. 2D is a schematic cross-sectional side view of the dielectric fluid tester of FIG. 2C, showing different positions of the electrodes and one of the seals, relative to the container, thereby providing a different volume available inside the container for a fluid sample, in accordance with some examples.
Figure 2E:
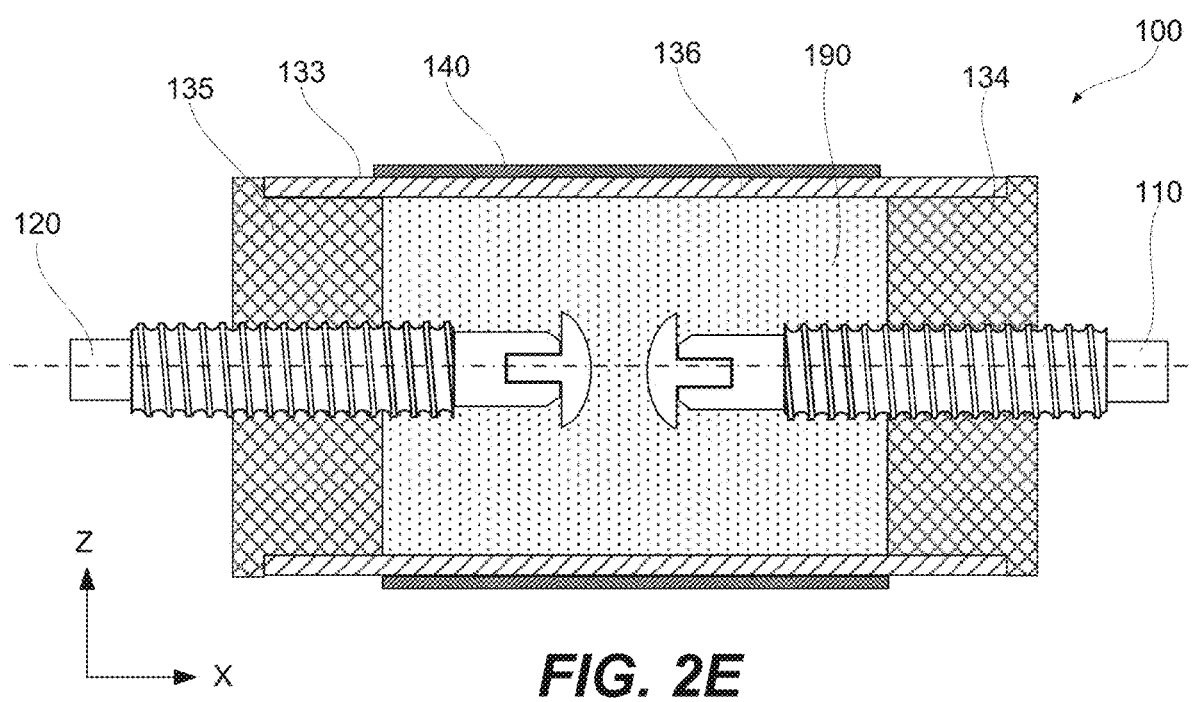
FIG. 2E is a schematic cross-sectional side view of a dielectric fluid tester, showing a ground plane positioned outside of the container of the dielectric fluid tester, in accordance with some examples.
Figure 3A:
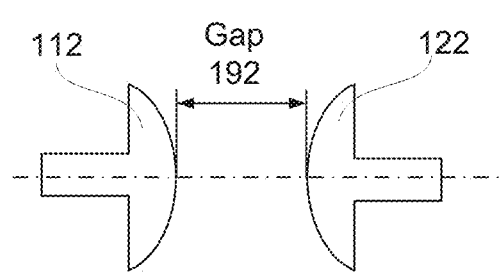
FIGS. 3A-3F are schematic cross-sectional side views of different examples of test heads, in accordance with some examples.
Figure 3B:
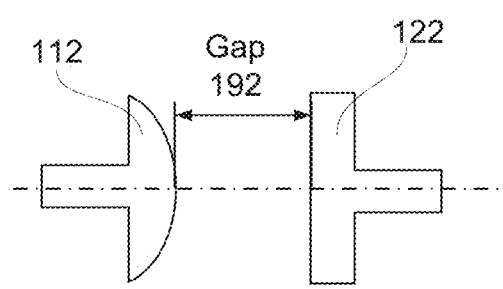
Figure 3C:
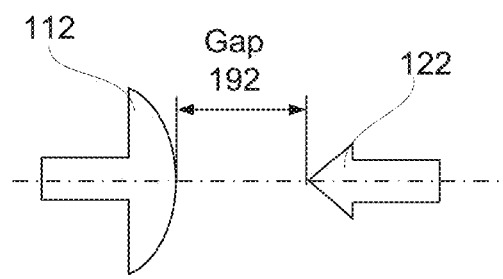
Figure 3D:
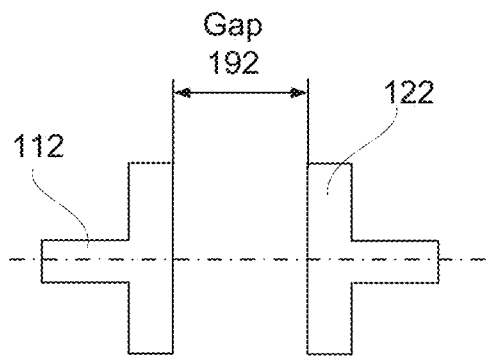
Figure 3E:
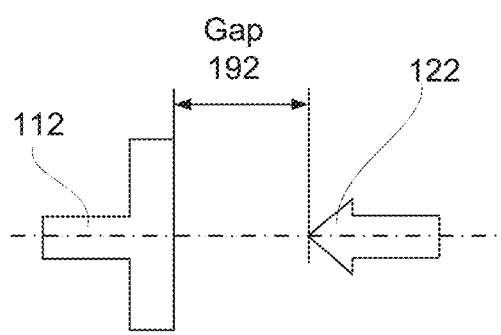
Figure 3F:
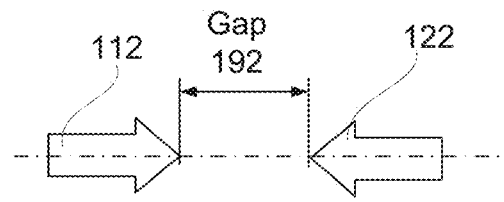

FIG. 3A is a schematic illustration of first test head 112 and second test head 122 both having semi-spherical shapes, which is also referred to as "mushroom head" shapes. The use of such shapes relaxes the requirement for alignment of first test head 112 and second test head 122, e.g., being collinear. FIG. 3B is a schematic illustration of first test head 112 and second test head 122 in which first test head 112 has a semi-spherical shape, while second test head 122 has a planar shape. FIG. 3C is a schematic illustration of first test head 112 and second test head 122 in which first test head 112 has a semi-spherical shape, while second test head 122 has a pointy shape or a shape having a sharp edge facing first test head 112. FIG. 3D is a schematic illustration of first test head 112 and second test head 122, both having planar shapes. FIG. 3E is a schematic illustration of first test head 112 and second test head 122 in which first test head 112 has a planar shape, while second test head 122 has a pointy shape. Finally, FIG. 3F is a schematic illustration of first test head 112 and second test head 122, both having pointy shapes. Different test head configurations are used, e.g., to simulate different operating conditions for a tested fluid sample. Other test head configurations are also within the scope of the testing apparatus described herein. In some embodiments, a Verband Deutscher Elektrotechniker (VDE) electrode can be used, such VDE electrode having a mushroom shape as shown in FIGS. 2C-2E (reference numerals 112 and 122), and FIGS. 3A-3C (reference numeral 112).

In some examples, first electrode 110 or second electrode 120 are stationary relative to container 130. This feature allows to set gap 192 and to keep gap 192 at the constant level. For example, gap 192 is set based on a specific test protocol.

Figure 2A:
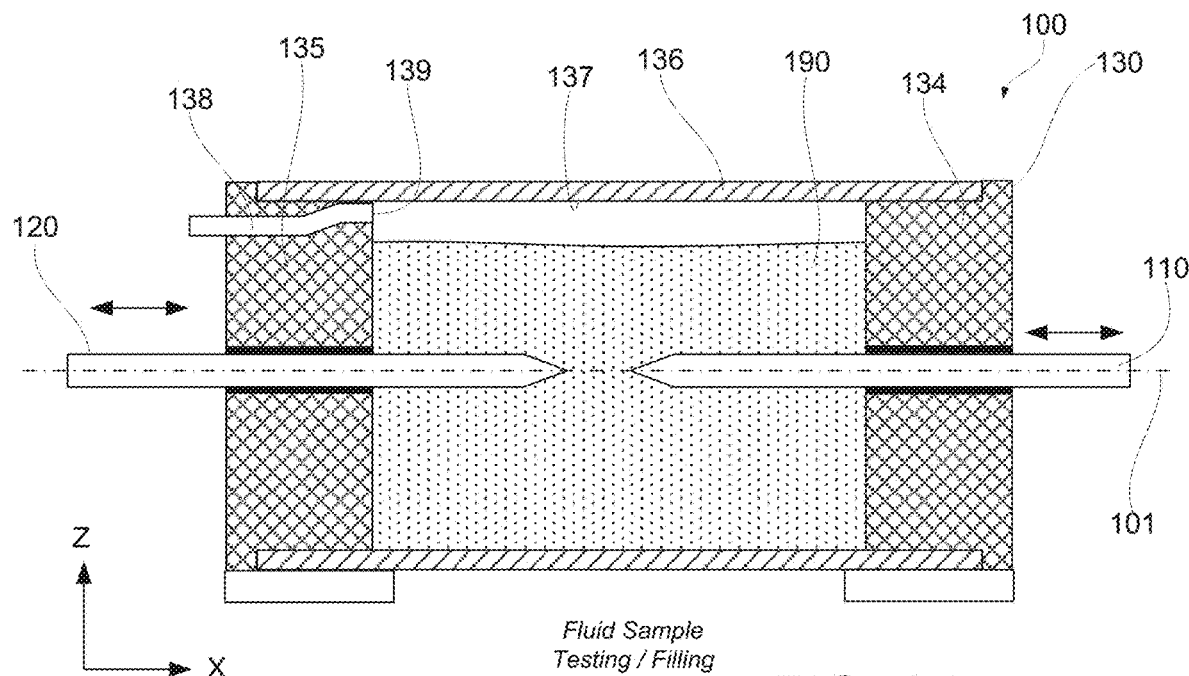
FIG. 2A is a schematic cross-sectional side view of a dielectric fluid tester, comprising collinear electrodes used for testing of a fluid sample, in accordance with some examples.
Figure 2B:
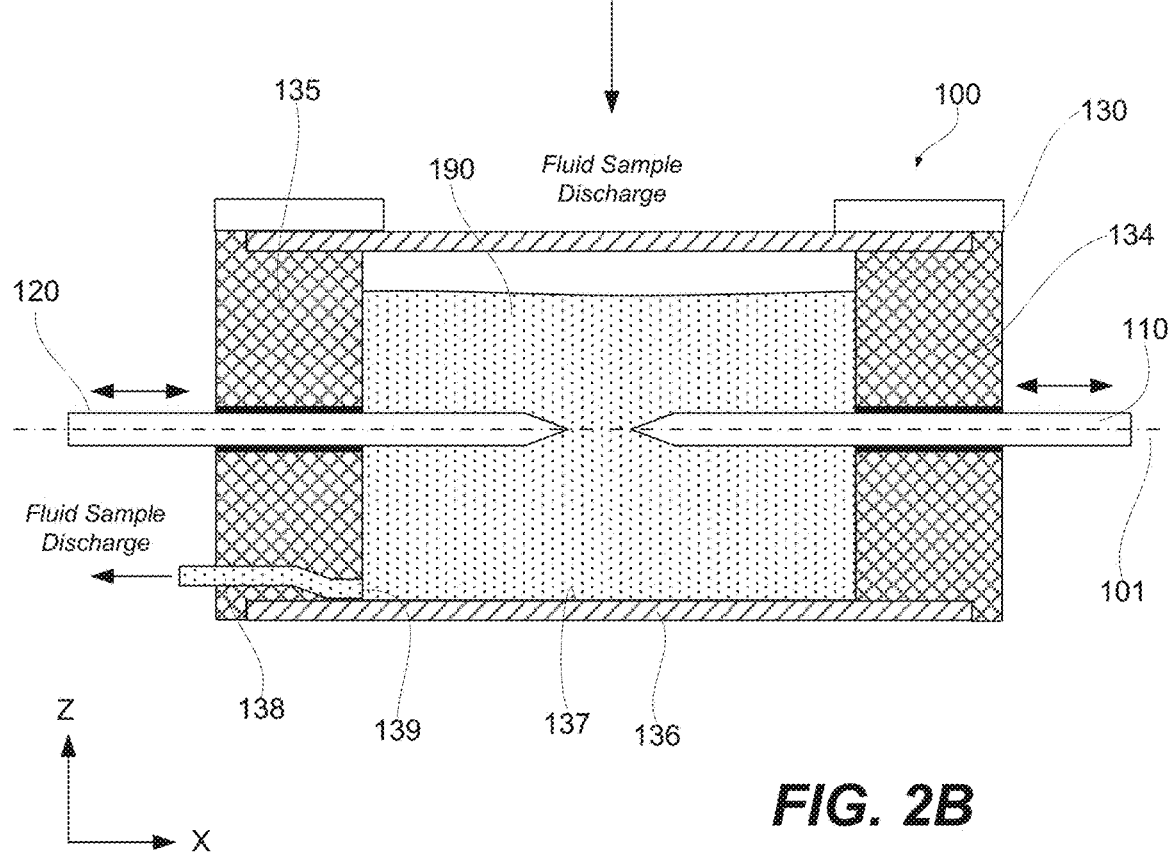
FIG. 2B is a schematic cross-sectional side view of the dielectric fluid tester in FIG. 2A demonstrating removal of the fluid sample, in accordance with some examples.

Alternatively, in some examples and with reference to FIGS. 1B and 2A-2E, at least one of first electrode 110 or second electrode 120 is movably coupled to container 130. This movable coupling allows adjusting gap 192 between first test head 112 and second test head 122. For example, first electrode 110 is movably coupled to insulating cap 134 or, more specifically, slidably coupled to insulating cap 134 as, e.g., is shown in FIGS. 2A and 2B or threadably coupled to insulating cap 134 as, e.g., is shown in FIGS. 2C and 2D. Similarly, second electrode 120 is movably coupled to additional insulating cap 135 or, more specifically, slidably coupled to additional insulating cap 135 as, e.g., is shown in FIGS. 2A and 2B or threadably coupled to additional insulating cap 135 as, e.g., is shown in FIGS. 2C and 2D. The ability to adjust gap 192 provides new testing opportunities, e.g., finding a correlation between the dielectric breakdown voltage and the gap. Furthermore, in some examples, the movable coupling between first electrode 110 and insulating cap 134 and, separately, between second electrode 120 and additional insulating cap 135, is a sealing coupling, which isolated the interior of container 130 from the environment outside of container 130 (e.g., prevents fluid sample 190 from escaping container 130).

In some examples, only one of first electrode 110 and second electrode 120 is movably coupled (e.g., threadably coupled) to container 130. The other one of first electrode 110 and second electrode 120 is fixedly coupled to container 130. As such, first electrode 110 and second electrode 120 operate like a micrometer when adjusting gap 192 between first test head 112 and second test head 122. For example, first electrode 110 is threadably coupled or slidably coupled to insulating cap 134, while second electrode 120 is fixedly coupled to container 130. In these examples, gap 192 between first test head 112 and second test head 122 is adjustable by first electrode 110 alone.

In some examples, both first electrode 110 and second electrode 120 are movably coupled to container 130 as, e.g., is shown in FIGS. 1B and 2A-2E. For example, first electrode 110 and second electrode 120 are threadably coupled to insulating cap 134 as, e.g., is shown in FIG. 1B. Alternatively, first electrode 110 is slidably coupled to insulating cap 134, while second electrode 120 is slidably coupled to additional insulating cap 135 as, e.g., is shown in FIGS. 2A-2B. In some examples, first electrode 110 is threadably coupled to insulating cap 134, while second electrode 120 is threadably coupled to additional insulating cap 135 as, e.g., is shown in FIGS. 2C-2D. In these examples, gap 192 between first test head 112 and second test head 122 is adjustable by either one of first electrode 110 or second electrode 120.

The ability to move both electrodes also allows controlling the depth of gap 192 within container 130 or, more specifically, within fluid sample 190 as, e.g., is shown in FIG. 1B. For example, the depth is controlled independently from gap 192. Alternatively, the pressure inside container 130 is used to simulate different depths of gap 192 within fluid sample 190. Furthermore, the ability to move both electrodes also provides control of the volume inside container 130, available for fluid sample 190 as will now be described with reference to FIGS. 2C and 2D.

In some examples and with reference to FIGS. 2C and 2D, dielectric fluid tester 100 further comprises first seal 141, coupled to first electrode 110 and positioned inside container 130. First seal 141 is slidably sealed against housing 136 and at least partially defines the volume inside container 130, the volume available for fluid sample 190. When first seal 141 is slid inside container 130, the volume available for fluid sample 190 changes. Specifically, when first seal 141 is slid away from insulating cap 134, the volume available for fluid sample 190 decreases. However, when first seal 141 is slid toward insulating cap 134, the volume available for fluid sample 190 increases.

Referring to FIGS. 2C and 2D, in some examples, dielectric fluid tester 100 further comprising second seal 142. Second seal 142 is slidably sealed around second electrode 120. Furthermore, second seal 142 is positioned inside container 130 and is sealed and coupled to housing 136, e.g., non-slidably coupled to housing 136 or permanently coupled to housing 136. In these examples, second seal 142, together with first seal 141 and housing 136, defines the volume inside container 130 available for fluid sample 190. Furthermore, in these examples, access port 138 protrudes through second seal 142, e.g., to fill fluid sample 190, outgas fluid sample 190, and/or remove fluid sample 190.

Referring to the transition from FIG. 2C to FIG. 2D, first electrode 110 moves to the right, which also moves first seal 141 to the right and toward insulating cap 134. In some examples, this movement of first electrode 110 and first seal 141 is specifically used to control the volume inside container 130 available for fluid sample 190. Second electrode 120 also moves to the right and away from additional insulating cap 135. The movement of second electrode 120 is used, e.g., to control gap 192 between first test head 112 and second test head 122. Even through second electrode 120 also moves to the right, second seal 142 retains the same position inside container 130. As noted above, second seal 142 is slidably sealed around second electrode 120, thereby allowing second electrode 120 to move with container 130, while second seal 142 remains stationary and retains the position within container 130. The volume inside container 130, available for fluid sample 190, is substantially smaller in the configuration of dielectric fluid tester 100 shown FIG. 2C than in the configuration shown FIG. 2D. In some examples, dielectric fluid tester 100 is configured to change (increase and/or decrease) the volume inside container 130 available for fluid sample 190 by at least about 25% or even at least about 40% from the average volume.

Referring to FIGS. 2A-2E, in some examples, container 130 further comprises additional insulating cap 135. In more specific examples, first electrode 110 is movably coupled to insulating cap 134, while second electrode 120 is movably coupled to additional insulating cap 135. More specifically, first electrode 110 is slidably or threadably coupled to insulating cap 134, Similarly, second electrode 120 is slidably or threadably coupled to additional insulating cap 135.

In some examples, insulating cap 134 and additional insulating cap 135 are positioned on the opposite ends of housing 136, as shown in FIGS. 2A-2E. This allows a collinear orientation of first electrode 110 and second electrode 120. In other words, in some examples, first electrode 110 is collinear to second electrode 120, as shown in FIGS. 2A-2E. Furthermore, in some examples, housing 136 is a cylindrical tube, as shown in FIGS. 2A-2E.

Referring to FIGS. 2A and 2B, access port 138 comprises interior opening 139, disposed proximate to interior wall 137 of housing 136. This orientation of interior opening 139 allows filling of container 130 with fluid sample 190, removing fluid sample 190 from container 130, and/or outgassing fluid sample 190. For example, access port 138 is selectively couplable to fluid sample supply 410 (see FIG. 4). While fluid sample 190 is supplied into container 130, the orientation of dielectric fluid tester 100 is shown in FIG. 2A. The same orientation of dielectric fluid tester 100 is used for outgassing fluid sample 190 while inside container 130, e.g., while interior opening 139 is positioned about the fluid level. To remove fluid sample 190 from container 130, dielectric fluid tester 100 is rotated around center axis 101 to position interior opening 139 below the fluid level. For example, dielectric fluid tester 100 is rotated around 180° (e.g., between about 160° and about 200°) between the filling/gassing position shown in FIG. 2A and the fluid removal position shown in FIG. 2B.

Figure 2F:
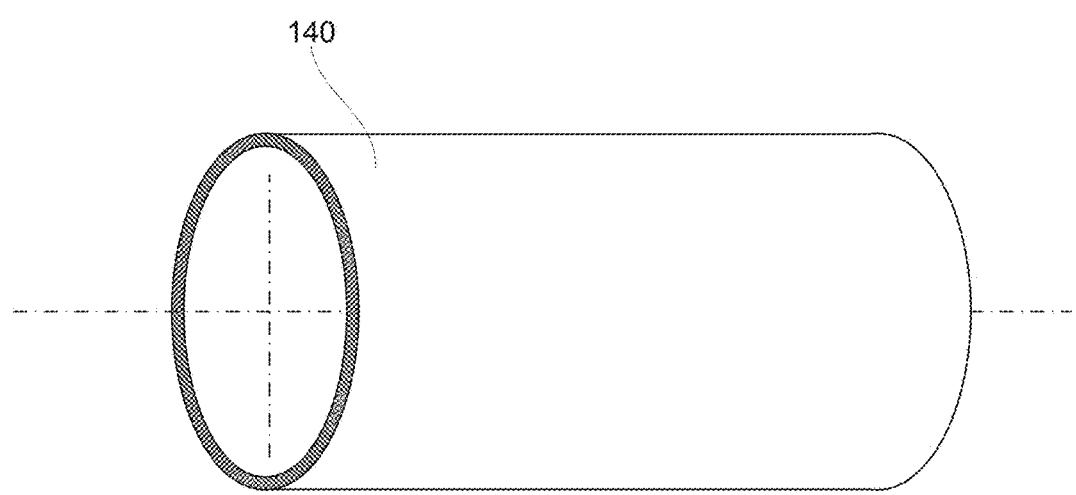
FIG. 2F is a schematic perspective view of the ground plane of the dielectric fluid tester in FIG. 2E, in accordance with some examples.

Referring to FIG. 1A and FIGS. 2E-2F, in some examples, dielectric fluid tester 100 comprises ground plane 140. Ground plane 140 is used for changing the electrical field within fluid sample 190 as described below with reference to FIGS. 6A-6C. Referring to FIG. 1A, in some examples, ground plane 140 is positioned inside container 130 and in contact with fluid sample 190. Alternatively and referring to FIG. 3E, ground plane 140 is positioned outside container 130, e.g., parallel to exterior wall 133 of housing 136. Ground plane 140 is planar (referring to FIG. 1A) or cylindrical (referring to FIGS. 2E-2F)

Figure 6A:
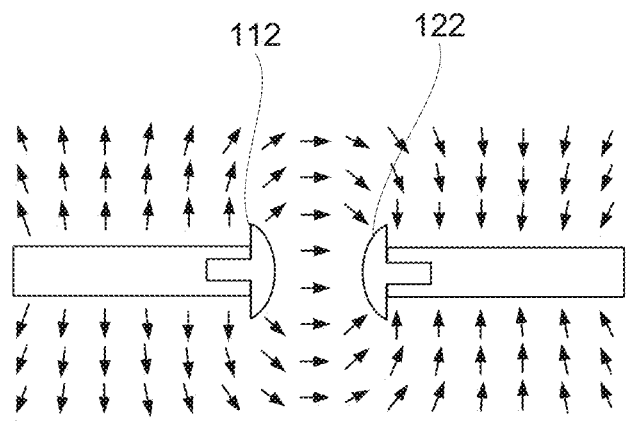
FIGS. 6A-6C are different examples of electrical field distribution between two test heads: without and with a ground plane.
Figure 6B:
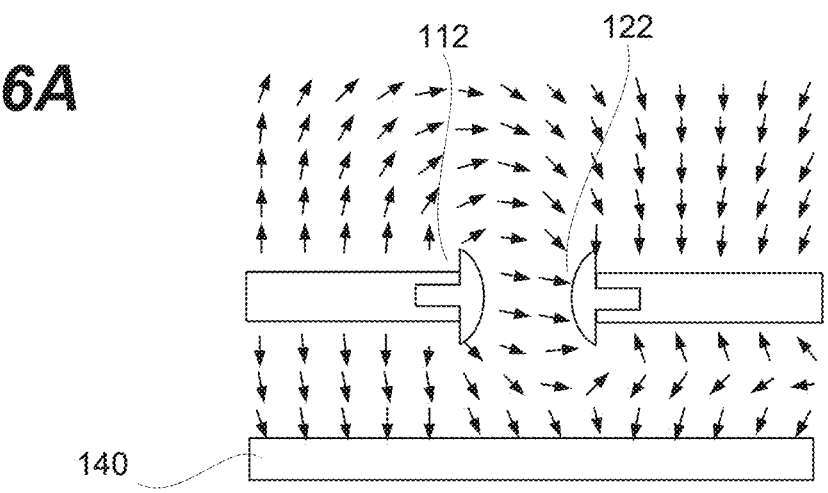
Figure 6C:
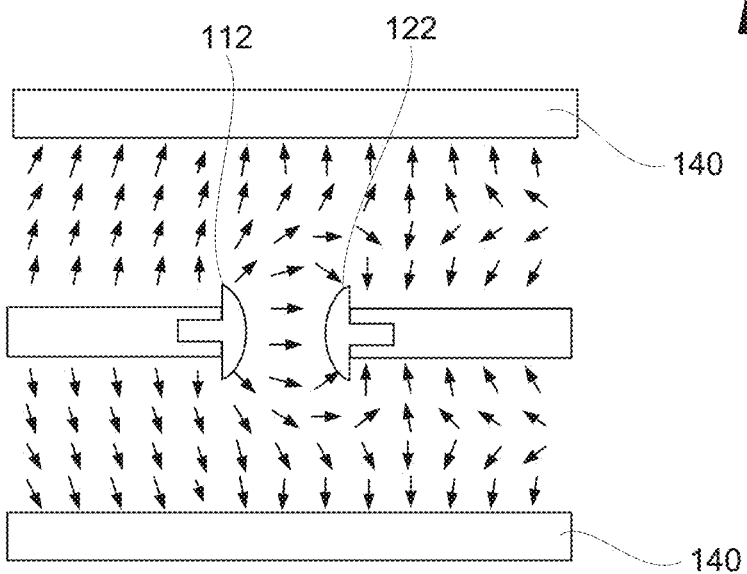

FIGS. 6A-6C are different examples of the electrical field distribution between first test head 112 and second test head 122, e.g., without and with ground plane 140. When ground plane 140 is used, in some examples, ground plane 140 is at a potential of first test head 112, second test head 122, or some other potential (e.g., grounded). FIG. 6A is a schematic illustration of the electrical field distribution produced by first test head 112 and second test head 122, at different potentials, without any ground planes or external effects on the fields around the probes.

FIG. 6B is a schematic illustration of the electrical field distribution produced by first test head 112 and second test head 122, at different potentials, with ground plane 140, maintained at the potential of second test head 122 and having a planar shape. In this example, second test head 122 is positioned between first test head 112 and ground plane 140. This configuration shows the effect of an unbalanced electric field due to external influences. A partial shield is used, in some examples, to overcome an external influence or the influence the field to imitate the use of liquid sample in real life.

FIG. 6C is a schematic illustration of the electrical field distribution produced by first test head 112 and second test head 122, at different potentials, with ground plane 140, maintained at the potential of second test head 122 and having a cylindrical shape. In this example, ground plane 140 surrounds both first test head 112 and second test head 122. This configuration reduces the eclectic field intensity between the closest points of the test heads. At the same time, this configuration provides a uniform field in the center, between the two test heads. This configuration is used, for example, in an offset condition to move the concentration of the eclectic field slightly off center of the test probes.

Examples of Systems for Determining Dielectric Breakdown Voltages of Fluid Samples FIG. 4 is a block diagram representing system 400 for determining a dielectric breakdown voltage of fluid sample 190. System 400 comprises dielectric fluid tester 100, various examples of which are described above. Specifically, dielectric fluid tester 100 comprises container 130, first electrode 110 with first test head 112 and protruding into container 130, and second electrode 120 with second test head 122 and protruding into container 130. First test head 112 and second test head 122 face each other and are separated by gap 192.

In some examples, system 400 comprises power supply 430, electrically coupled to each of first electrode 110 and second electrode 120 and configured to control a voltage (e.g., AC and/or DC) applied between first electrode 110 and second electrode 120. In more specific examples, power supply 430 is also electrically coupled to ground plane 140. In some examples, power supply 430 is configured to vary the voltage applied between first electrode 110 and second electrode 120, e.g., to perform a voltage sweep.

In some examples, system 400 comprises pressure-controlling source 420, fluidically coupled to an interior of container 130 and configured to control pressure inside container 130. Pressure-controlling source 420 is configured to reduce the pressure inside container 130 (e.g., to degas fluid sample 190) and/or to pressurize container 130. As noted above, dissolved gases and bubbles tend to impact the dielectric breakdown of many liquids. Furthermore, the external pressure impacts the dielectric breakdown of various materials, in particular gases.

In some examples, system 400 comprises temperature controller 440, thermally coupled to container 130 and configured to control temperature of fluid sample 190 inside container 130. As noted above, the temperature tends to impact the dielectric breakdown of various types of fluid sample 190. In some examples, the test temperature represents an operating temperature of a tested fluid. For examples, some fluid are operated below or above the ambient temperature. Furthermore, in some examples, fluid sample 190 is tested at multiple different temperatures, e.g., to determine the effect of temperature on dielectric breakdown. Finally, when fluid sample 190 is tested multiple times, each dielectric breakdown causes localized heating of fluid sample 190, which is controlled by temperature controller 440.

In some examples, system 400 comprises electrode positioner 450, mechanically coupled to at least one of first electrode 110 or second electrode 120 and configured to control position of at least one of first electrode 110 or second electrode 120 relative to container 130. For example, electrode positioner 450 is a servo-motor, configured to rotate at least one of first electrode 110 or second electrode 120, wherein at least one of first electrode 110 or second electrode 120 is slidably or threadably coupled to container 130.

In some examples, system 400 comprises system controller 490, communicatively coupled to at least power supply 430 for controlling voltage applied between first electrode 110 and second electrode 120 and for determining dielectric breakdown voltage of fluid sample 190. Furthermore, in some examples, system controller 490 is communicatively coupled to electrode positioner 450 to control position of at least one of first electrode 110 or second electrode 120 relative to container 130. In some examples, system controller 490 is communicatively coupled to temperature controller 440 to control temperature of fluid sample 190 inside container 130. In some examples, system controller 490 is communicatively coupled to pressure-controlling source 420 to control pressure inside container 130.

Figure 5:
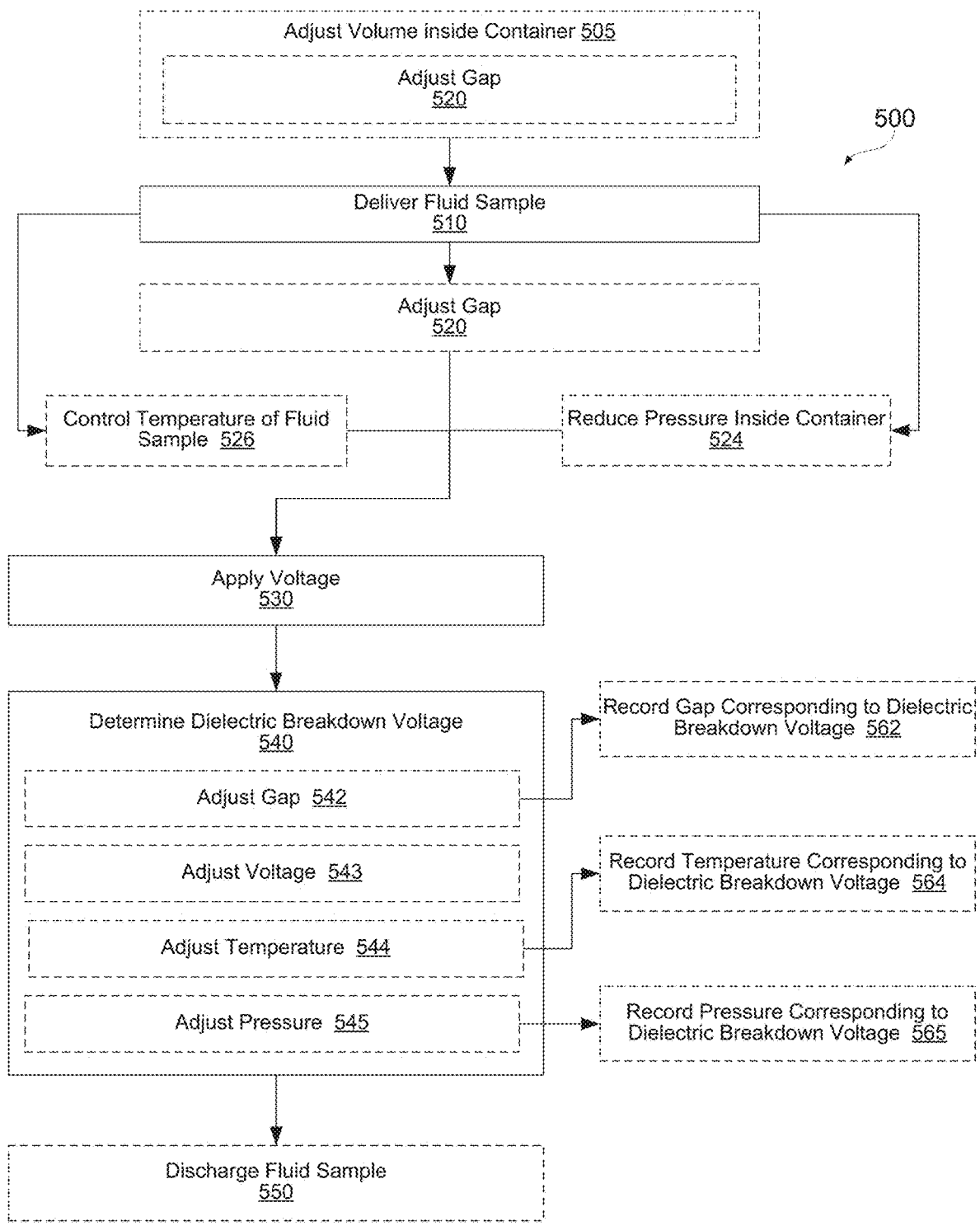
FIG. 5 is a process flowchart corresponding to a method for detecting a dielectric breakdown voltage of a fluid sample using a dielectric fluid tester, in accordance with some examples.

Examples of Methods for Detecting Dielectric Breakdown Voltages in Fluid Samples FIG. 5 is a process flowchart corresponding to method 500 for detecting a dielectric breakdown voltage of fluid sample 190, in accordance with some examples. Method 500 is performed using dielectric fluid tester 100, various examples of which are described above.

In some examples, method 500 comprises adjusting (block 505 in FIG. 5) the volume inside container 130 available for fluid sample 190. For example, this operation is performed prior to delivering fluid sample 190 into container 130. Alternatively, this operation is performed while fluid sample 190 is already inside container 130. Referring to FIGS. 2C and 2D, in some examples, adjusting volume inside container 130 comprises moving first seal 141. First seal 141 is slidably sealed against housing 136. First seal 141 is coupled to first electrode 110 such that moving first seal 141 comprises moving first electrode 110 relative to insulating cap 134.

In some examples, method 500 comprises delivering (block 510 in FIG. 5) fluid sample 190 into container 130 of dielectric fluid tester 100. As noted above, container 130 comprising insulating cap 134, housing 136, and access port 138. Furthermore, dielectric fluid tester 100 comprises first electrode 110 with first test head 112 and second electrode 120 with second test head 122. In some examples, fluid sample 190 is delivered through access port 138. Alternatively, insulating cap 134 is separated from housing 136 to deliver fluid sample 190.

Some examples of fluid sample 190 include but are not limited to FLUORINERT™ Electronic Liquid FC-72, Novec™ 649 (available from 3M in Saint Paul, Minn.), sulfur hexafluoride ($SF_6$), octafluorocyclobutane (R-C318) gas, and the like and combinations or mixtures thereof. In some examples, fluid sample 190 is a liquid. Alternatively, fluid sample 190 is a gas.

In some examples, the volume of fluid sample 190 delivered to container 130 is less than 100 milliliters, less than 50 milliliters, less than 20 milliliters, or even less than less than 10 milliliters. As noted above, conventional dielectric tests require much larger volumes.

In some examples, method 500 comprises reducing (block 524 in FIG. 5) the pressure inside container 130 to degas fluid sample 190, e.g., when fluid sample 190 is liquid. For example, the pressure is reduced to just above the boiling point to the liquid. This degassing operation is performed prior to testing fluid sample 190 for the dielectric breakdown, e.g., prior to applying a voltage between first electrode 110 and second electrode 120. This degassing operation helps to reduce the effect of gasses dissolved in the tested liquids and/or bubbles present in the liquid and raises the density of the material being tested. When testing gas the pressure can be raise to increase the density of the gas during test.

In some examples, method 500 comprises adjusting (block 520 in FIG. 5) gap 192 between first test head 112 and second test head 122, before applying voltage between first electrode 110 and second electrode 120. In other words, gap 192 is preset to certain value before any dielectric breakdown testing. Adjusting gap 192 involves, e.g., turning one or both first electrode 110 and second electrode 120 relative to insulating cap 134 and/or additional insulating cap 135.

In some examples, method 500 comprises controlling (block 526 in FIG. 5) the temperature of fluid sample 190 inside container 130, before applying the voltage between first electrode 110 and second electrode 120. In other words, the temperature is preset to a certain value (e.g., a test temperature) before any dielectric breakdown testing. For example, the temperature of fluid sample 190 is controlled using temperature controller 440, which is thermally coupled to container 130. It should be noted that, in some examples, this initial temperature is varied during testing.

In some examples, method 500 comprises applying (block 530 in FIG. 5) voltage between first electrode 110 and second electrode 120. This operation is performed using, e.g., power supply 430, which is electrically coupled to each of first electrode 110 and second electrode 120. It should be noted that, in some examples, this initial voltage is varied during testing.

In some examples, method 500 comprises determining (block 540 in FIG. 5) the dielectric breakdown voltage by performing one of the following: (a) adjusting (block 542 in FIG. 5) gap 192 between first test head 112 and second test head 122; (b) adjusting (block 543 in FIG. 5) the voltage between first electrode 110 and second electrode 120; (c) adjusting (block 544 in FIG. 5) the temperature of fluid sample 190 inside container 130; or (d) adjusting (block 545 in FIG. 5) pressure inside container 130. More specifically, only one of these operations (a)-(d) is performed in a given timeframe. For example, gap 192 is adjusted (e.g., reduced) while other parameters (including the voltage between first electrode 110 and second electrode 120) are kept constant. In another example, the voltage is adjusted (e.g., increased) while other parameters are kept constant. In yet another example, the temperature is adjusted (e.g., increased) while other parameters are kept constant. Finally, in yet another example, the pressure is adjusted (e.g., increased or decreased) while other parameters are kept constant. For example, the pressure inside container is adjusted reduced by fluidly connecting access port 138 to pressure-controlling source 420. Alternatively, two or more these operations (a)-(d) are performed simultaneously. For example, gap 192 and the voltage are adjusted at the same time. In embodiments, the gap adjustment is very precise, and can be adjusted in terms of micrometer adjustment, such as from about 1 micrometer to about 100 micrometers, or from about 1 micrometer to about 50 micrometers, or from about 1 micrometer to about 25 micrometers, or from about 1 micrometer to about 10 micrometer adjustment.

In some examples, gap 192 between first test head 112 and second test head 122 is between about 1 millimeter and about 20 millimeters or, more specifically, between about 2 millimeters and about 10 millimeters. For examples, gap 192 is maintained constant or varied as, e.g., described above. In some examples, adjusting gap 192 between first test head 112 and second test head 122 comprises rotating at least one of first electrode 110 or second electrode 120 relative to container 130. More specifically, adjusting gap 192 between first test head 112 and second test head 122 comprises rotating only first electrode 110 relative to container 130, while second electrode 120 is kept stationary relative to container 130.

In some examples, the temperature of fluid sample 190 inside container 130 is between the cryogenic temperature (e.g., −267° C.) and the room temperature (+25° C.) or between the room temperature (+25° C.) and an elevated temperature (e.g., +300° C.), such as between about −55° C. and about +125° C. For examples, the temperature is maintained constant or varied as, e.g., described above.

In some examples, the voltage applied between first electrode 110 and second electrode 120 is between DV and about 60 KV or, more specifically, between 0 V and about 5 KV, or even between about 5 KV about 60 KV. For examples, the voltage is maintained constant or varied as, e.g., described above.

In some examples, adjusting (block 543) the voltage between first electrode 110 and second electrode 120 is performed in accordance with a voltage sweep. For example, a linear DC voltage is increased (e.g., gradually) from a minimum voltage value to a maximum voltage value or, e.g., until a maximum allowed current is exceeded or an arc event occurs. In some examples, a natural log rhythmic curve is used to save time in running the tests.

In some examples, the voltage between first electrode 110 and second electrode 120 is provided by an alternating current (AC). In other examples, the voltage between first electrode 110 and second electrode 120 is provided by a direct current (DC). DC-voltage testing allows determining a maximum static voltage, which fluid sample 190 is able to withstand. On the other hand, AC-voltage testing is a dynamic test, in which the voltage rises and falls at a predetermined frequency and waveform. In some examples, the frequency of AC-voltage testing ranges from about $10^3$ Hz to about $10^{12}$ Hz or, more specifically, from about $10^3$ Hz to about $10^9$ Hz or even from about $10^3$ Hz to about $10^6$ Hz. In some examples, the voltage can be held constant, while the frequency changes. Furthermore, different wave forms like sinusoidal, triangular, saw-tooth and square waves provide different dynamic conditions.

In some examples, the pressure inside container 130 is between about $10^{-12}$ Torr and about $10^5$ Torr or, more specifically, between about $10^{-12}$ Torr and about 760 Torr or, more specifically, or between about 760 Torr and about $10^5$ Torr. For example, the temperature is maintained constant or varied as, e.g., described above.

In some examples, method 500 comprises discharging (block 550 in FIG. 5) fluid sample 190 from container 130 through access port 138. In more specific examples, this discharging operation comprises rotating dielctric fluid tester 100 around center axis 101 of dielectric fluid tester 100 as, e.g., schematically shown in FIGS. 2A and 2B.

In some examples, method 500 comprises recording (block 562 in FIG. 5) the value of gap 192 corresponding to the dielectric breakdown voltage. For example, gap 192 is reduced, while the voltage is kept constant, until the dielectric breakdown occurs. In some examples, the test is repeated multiple times (e.g., at different voltage levels) to establish a correlation between the dielectric breakdown voltage and gap 192, Alternatively, the voltage is increased while gap 192 is kept contact until the dielectric breakdown. The test is also repeated to establish a correlation between the dielectric breakdown voltage and gap 192.

In some examples, method 500 comprises recording (block 564 in FIG. 5) the value of the temperature of fluid sample 190 corresponding to the dielectric breakdown voltage. For example, the temperature is changes (e.g., increased or decreased), while the voltage is kept constant, until the dielectric breakdown occurs. In some examples, the test is repeated multiple times (e.g., at different voltage levels) to establish a correlation between the dielectric breakdown voltage and the temperature of fluid sample 190. Alternatively, the voltage is increased while the temperature of fluid sample 190 is kept contact until the dielectric breakdown. The test is also repeated to establish a correlation between the dielectric breakdown voltage and the temperature of fluid sample 190.

In some examples, method 500 comprises recording (block 566 in FIG. 5) the pressure inside container 130 corresponding to the dielectric breakdown voltage. For example, the pressure is changes (e.g., increase or decreases), while the voltage is kept constant, until the dielectric breakdown occurs. In some examples, the test is repeated multiple times (e.g., at different voltage levels) to establish a correlation between the dielectric breakdown voltage and the pressure inside container 130. Alternatively, the voltage is increased while the pressure inside container 130 is kept contact until the dielectric breakdown. The test is also repeated to establish a correlation between the dielectric breakdown voltage and the pressure inside container 130.

In some examples, a multivariable correlation (e.g., the dielectric breakdown voltage as a function of gap 192, the temperature of fluid sample 190, and/or the pressure inside container 130) is established. This multivariable correlation is provided, for example, by performing multiple combinations of the tests describe above.

Aircraft Examples

In some examples, methods and systems described above are used on aircraft and, more generally, by the aerospace industry. Specifically, these methods and systems can be used during fabrication of aircraft as well as during aircraft service and maintenance.

Figure 7:
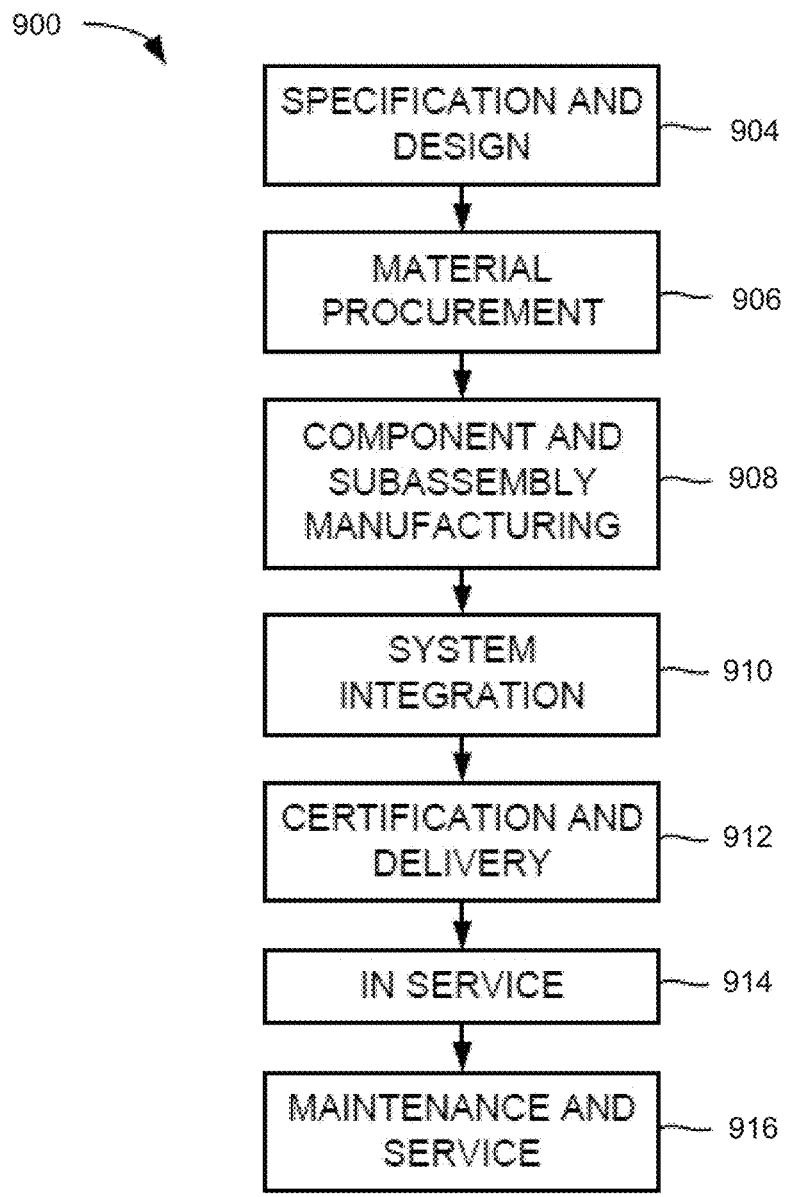
FIG. 7 is a process flowchart corresponding to a method for manufacturing and service the aircraft.
Figure 8:
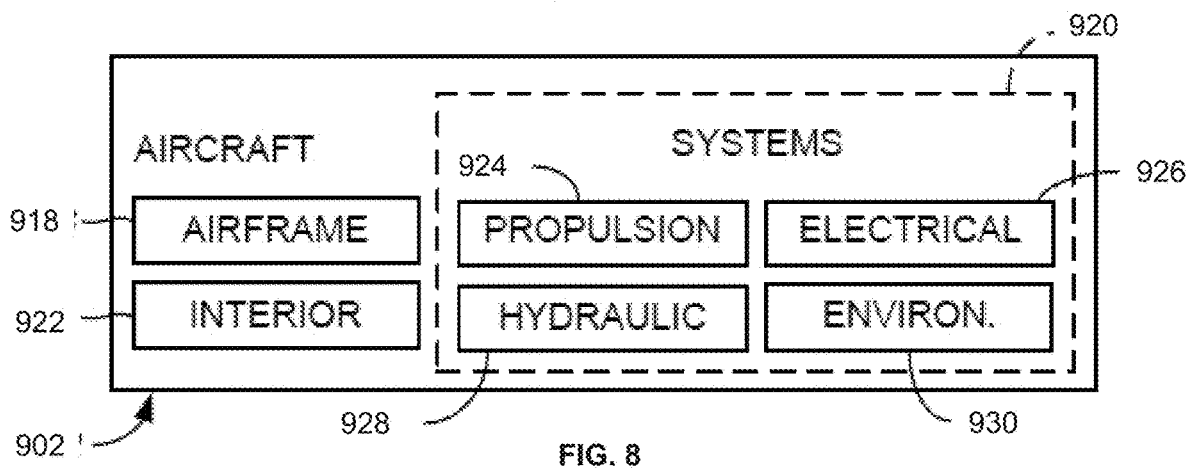
FIG. 8 illustrates a block diagram of an example of an aircraft, in accordance with some examples.

Accordingly, the apparatus and methods described above are applicable for aircraft manufacturing and service method 900 as shown in FIG. 7 and for aircraft 902 as shown in FIG. 8. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of venders, subcontractors, and suppliers; and an operator can be an airline, leasing company, military entity, service organization, and so on.

As shown in FIG. 8, aircraft 902 produced by method 900 includes airframe 918 with plurality of systems 920, and interior 922. Examples of systems 920 include one or more of propulsion system 924, electrical system 926, hydraulic system 928, and environmental system 930, Any number of other systems can be included. Although an aerospace example is shown, the principles of the examples described herein is applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof is utilized during manufacturing 908 and system integration 910, for example, by substantially expediting assembly of or reducing the cost of an aircraft 902. Similarly, one or more of apparatus examples, method examples, or a combination thereof is utilized while aircraft 902 is in service, for example and without limitation, to maintenance and service 916.

Further Examples

Further, this description includes examples according to following clauses:

Clause 1. A dielectric fluid tester for determining a dielectric breakdown voltage of a fluid sample, the dielectric fluid tester comprising:

a container, for containing the fluid sample, the container comprising an insulating cap, a housing, and an access port, configured to connect to a pressure-controlling source and fluidically couple the pressure-controlling source to the fluid sample while the fluid sample is inside the container;

a first electrode, comprising a first test head and protruding into the container through the insulating cap; and a second electrode, comprising a second test head and protruding into the container, wherein the first test head and the second test head face each other and are separated by an gap, forming a test zone within the container between the first test head and the second test head.

Clause 2. The dielectric fluid tester of clause 1, wherein at least one of the first electrode or the second electrode is movably coupled to the container such that the gap between the first test head and the second test head is adjustable.

Clause 3. The dielectric fluid tester of clause 2, wherein only one of the first electrode or the second electrode is movably coupled to the container.

Clause 4. The dielectric fluid tester of clause 3, wherein the only one of the first electrode or the second electrode is threadably coupled to the container.

Clause 5. The dielectric fluid tester of any one of clauses 1-4, wherein both the first electrode and the second electrode are movably coupled to the container such that the gap between the first test head and the second test head is adjustable by either one of the first electrode or the second electrode.

Clause 6. The dielectric fluid tester of clause 5, further comprising a first seal, wherein:

the first seal is coupled to the first electrode;

the first seal is positioned inside the container and slidably sealed against the housing; and the first seal is at least partially defines a volume inside the container available for the fluid sample.

Clause 7. The dielectric fluid tester of clause 6, further comprising a second seal, wherein:

the second seal is slidably sealed around the second electrode;

the second seal is positioned inside the container and coupled to the housing; and the second seal, together with the first seal and the housing, defines the volume inside the container available for the fluid sample.

Clause 8. The dielectric fluid tester of clause 7, wherein the access port protrudes through the second seal.

Clause 9. The dielectric fluid tester of clause 5, wherein:

the container further comprises an additional insulating cap; and the first electrode is movably coupled to the insulating cap.

Clause 10. The dielectric fluid tester of clause 9, wherein the second electrode is movably coupled to the additional insulating cap.

Clause 11. The dielectric fluid tester of clause 9, wherein the second electrode is fixedly coupled to the additional insulating cap.

Clause 12. The dielectric fluid tester of any one of clauses 9-11, wherein the first electrode is slidably or threadably coupled to the insulating cap.

Clause 13. The dielectric fluid tester of any one of clauses 9-12, wherein the insulating cap and the additional insulating cap are positioned on opposites ends of the housing.

Clause 14. The dielectric fluid tester of any one of clauses 1-13, wherein the housing is a cylindrical tube.

Clause 15. The dielectric fluid tester of any one of clauses 1-14, wherein the first electrode is collinear to the second electrode.

Clause 16. The dielectric fluid tester of any one of clauses 1-11, wherein the access port comprises an interior opening, disposed proximate to an interior wall of the housing.

Clause 17. The dielectric fluid tester of clause 16, wherein the access port is selectively couplable to a fluid sample supply.

Clause 18. The dielectric fluid tester of any one of clauses 1-17, further comprising a ground plane positioned parallel to an exterior wall of the housing.

Clause 19. The dielectric fluid tester of clause 18, wherein the ground plane is planar or cylindrical.

Clause 20. The dielectric fluid tester of any one of clauses 1-19, wherein a volume inside the container available for the fluid sample is less than 100 milliliters.

Clause 21. A method for detecting a dielectric breakdown voltage of a fluid sample using a dielectric fluid tester, the method comprising:

delivering the fluid sample into a container of the dielectric fluid tester, the container comprising an insulating cap, a housing, and an access port, the dielectric fluid tester comprising a first electrode, comprising a first test head, and a second electrode, comprising a second test head;

applying a voltage between the first electrode and the second electrode; and determining the dielectric breakdown voltage by at least one of:

adjusting a gap between the first test head and the second test head, adjusting the voltage between the first electrode and the second electrode, adjusting temperature of the fluid sample inside the container, or adjusting pressure inside the container.

Clause 22. The method of clause 21, wherein the gap between the first test head and the second test head is between 1 millimeter and 20 millimeters.

Clause 23. The method of any one of clauses 21-22, wherein the temperature of the fluid sample inside the container is between −267° C. and +125° C.

Clause 24. The method of any one of clauses 21-23, wherein the voltage applied between the first electrode and the second electrode is between DV and 60 KV.

Clause 25. The method of any one of clauses 21-24, wherein the pressure inside the container is between $10^{-12}$ Torr and $10^5$ Torr.

Clause 26. The method of any one of clauses 21-25, wherein determining the dielectric breakdown voltage comprises simultaneously performing two or more of:

adjusting a gap between the first test head and the second test head, adjusting the voltage between the first electrode and the second electrode, adjusting temperature of the fluid sample inside the container, or adjusting pressure inside the container.

Clause 27. The method of any one of clauses 21-26, further comprising, prior to applying the voltage between the first electrode and the second electrode, reducing the pressure inside the container to degas the fluid sample, wherein the fluid sample is liquid.

Clause 28. The method of any one of clauses 21-27, wherein the pressure inside the container is reduced by fluidly connecting the access port to a pressure-controlling source.

Clause 29. The method of any one of clauses 21-28, wherein the fluid sample is delivered through the access port.

Clause 30. The method of any one of clauses 21-29, further comprising, prior to applying the voltage between the first electrode and the second electrode, adjusting the gap between the first test head and the second test head.

Clause 31. The method of any one of clauses 21-30, further comprising, prior to applying the voltage between the first electrode and the second electrode, controlling the temperature of the fluid sample inside the container.

Clause 32. The method of any one of clauses 21-31, further comprising discharging the fluid sample from the container through the access port.

Clause 33. The method of clause 32, wherein discharging the fluid sample from the container comprises rotating the dielectric fluid tester around a center axis of the dielectric fluid tester.

Clause 34. The method of any one of clauses 21-33, wherein adjusting the voltage between the first electrode and the second electrode is performed in accordance with a voltage sweep.

Clause 35. The method of any one of clauses 21-34, wherein the voltage between the first electrode and the second electrode is provided by an alternating current (AC).

Clause 36. The method of any one of clauses 21-35, wherein the voltage between the first electrode and the second electrode is provided by a direct current (DC).

Clause 37. The method of any one of clauses 21-36, wherein the fluid sample has a volume of less than 100 milliliters.

Clause 38. The method of any one of clauses 21-33, further comprising, prior to delivering the fluid sample into the container, adjusting a volume inside the container available for the fluid sample.

Clause 39. The method of clause 34, wherein adjusting the volume inside the container available for the fluid sample comprises moving a first seal, slidably sealed against the housing, inside the container.

Clause 40. The method of clause 39, wherein the first seal is coupled to the first electrode, and wherein moving the first seal comprises moving the first electrode relative to the insulating cap.

Clause 41. The method of any one of clauses 21-40, wherein adjusting the gap between the first test head and the second test head comprises rotating at least one of the first electrode or the second electrode relative to the container.

Clause 42. The method of any one of clauses 21-41, wherein adjusting the gap between the first test head and the second test head comprises rotating only the first electrode relative to the container, while the second electrode is kept stationary relative to the container.

Clause 43. The method of any one of clauses 21-42, further comprising, after adjusting the gap between the first test head and the second test head, recording a value of the gap corresponding to the dielectric breakdown voltage.

Clause 44. The method of any one of clauses 21-43, further comprising, after adjusting the temperature of the fluid sample inside the container, recording a value of the temperature of the fluid sample inside the container corresponding to the dielectric breakdown voltage.

Clause 45. The method of any one of clauses 21-44, further comprising, after adjusting the pressure inside the container, recording a value of the pressure inside the container corresponding to the dielectric breakdown voltage.

Clause 46. A system for determining a dielectric breakdown voltage of a fluid sample, the system comprising:
a dielectric fluid tester, comprising a container, a first electrode, comprising a first test head and protruding into the container, and a second electrode, comprising a second test head and protruding into the container, wherein the first test head and the second test head face each other and are separated by a gap;
a power supply, electrically coupled to each of the first electrode and the second electrode and configured to control a voltage applied between the first electrode and the second electrode; and
a pressure-controlling source, fluidically coupled to an interior of the container and configured to control pressure inside the container.

Clause 47. The system of clause 46, further comprising a temperature controller, thermally coupled to the container and configured to controlled temperature of the fluid sample inside the container.

Clause 48. The system of any one of clauses 46-47, further comprising an electrode positioner, mechanically coupled to at least one of the first electrode or the second electrode and configured to control position of the at least one of the first electrode or the second electrode relative to the container.

Clause 49. The system of clause 48, wherein the electrode positioner is a servo-motor, configured to rotate the at least one of the first electrode or the second electrode, wherein the at least one of the first electrode or the second electrode is slidably or threadably coupled to the container.

Clause 50. The system of any one of clauses 46-49, further comprising a system controller, communicatively coupled to at least the power supply for controlling the voltage applied between the first electrode and the second electrode and for determining the dielectric breakdown voltage of the fluid sample.

CONCLUSION

Although the foregoing concepts have been described in some detail for purposes of clarity of understanding, it will be apparent that, in some examples, certain changes and modifications are practiced within the scope of the appended claims. It should be noted that there are many alternative ways of implementing the processes, systems, and apparatus. Accordingly, the present examples are to be considered as illustrative and not restrictive.

What is claimed is:

1. A dielectric fluid tester for determining a dielectric breakdown voltage of a fluid sample, the dielectric fluid tester comprising:
a container, for containing the fluid sample, the container comprising an insulating cap, a housing, and an access port, which protrudes from outside of the container into the container through the insulating cap and is configured to connect to a pressure-controlling source and fluidically couple the pressure-controlling source to the fluid sample while the fluid sample is inside the container;
a first electrode, comprising a first test head and protruding from outside the container into the container through the insulating cap; and
a second electrode, comprising a second test head and protruding from outside the container into the container, wherein the first test head and the second test head face each other and are separated by a gap, forming a test zone within the container between the first test head and the second test head, and wherein the first test head and the second test head are configured to determine the dielectric voltage breakdown of the fluid sample.

2. The dielectric fluid tester of claim 1, wherein at least one of the first electrode or the second electrode is movably coupled to the container such that the gap between the first test head and the second test head is adjustable.

3. The dielectric fluid tester of claim 1, wherein both the first electrode and the second electrode are movably coupled to the container such that the gap between the first test head and the second test head is adjustable by either one of the first electrode or the second electrode.

4. The dielectric fluid tester of claim 3, further comprising a first seal, wherein:
the first seal is coupled to the first electrode;
the first seal is positioned inside the container and slidably sealed against the housing; and
the first seal at least partially defines a volume inside the container available for the fluid sample.

5. The dielectric fluid tester of claim 4, further comprising a second seal, wherein:
the second seal is slidably sealed around the second electrode;
the second seal is positioned inside the container and coupled to the housing; and
the second seal, together with the first seal and the housing, defines the volume inside the container available for the fluid sample.

6. The dielectric fluid tester of claim 5, wherein the access port protrudes through the second seal.

7. The dielectric fluid tester of claim 3, wherein:
the container further comprises an additional insulating cap; and
the first electrode is movably coupled to the insulating cap.

8. The dielectric fluid tester of claim 1, wherein the first electrode is collinear to the second electrode.

9. The dielectric fluid tester of claim 1, wherein the access port comprises an interior opening, disposed proximate to an interior wall of the housing.

10. The dielectric fluid tester of claim 1, further comprising a ground plane, positioned parallel to an exterior wall of the housing.

11. The dielectric fluid tester of claim 1, wherein a volume inside the container available for the fluid sample is less than 100 milliliters.

12. A method for detecting a dielectric breakdown voltage of a fluid sample using a dielectric fluid tester, the method comprising:
 delivering the fluid sample into a container of the dielectric fluid tester, the container comprising an insulating cap, a housing, and an access port, which protrudes from outside of the container into the container through the insulating cap and is configured to connect to a pressure-controlling source and fluidically couple the pressure-controlling source to the fluid sample while the fluid sample is inside the container the dielectric fluid tester comprising a first electrode, comprising a first test head, and protruding from outside the container into the container through the insulating cap, and a second electrode, comprising a second test head and protruding from outside the container into the container through the insulating cap;
 applying a voltage between the first electrode and the second electrode; and
 determining the dielectric breakdown voltage by at least one of:
  adjusting a gap between the first test head and the second test head,
  adjusting the voltage between the first electrode and the second electrode,
  adjusting temperature of the fluid sample inside the container, or
  adjusting pressure inside the container.

13. The method of claim 12, wherein determining the dielectric breakdown voltage comprises simultaneously performing two or more of:
 adjusting the gap between the first test head and the second test head,
 adjusting the voltage between the first electrode and the second electrode,
 adjusting temperature of the fluid sample inside the container, or
 adjusting pressure inside the container.

14. The method of claim 12, further comprising, prior to applying the voltage between the first electrode and the second electrode, reducing the pressure inside the container to degas the fluid sample, wherein the fluid sample is liquid.

15. The method of claim 12, wherein the fluid sample has a volume of less than 100 milliliters.

16. The method of claim 12, further comprising, prior to delivering the fluid sample into the container, adjusting a volume inside the container available for the fluid sample.

17. The method of claim 16, wherein adjusting the volume inside the container available for the fluid sample comprises moving a first seal, slidably sealed against the housing, inside the container.

18. The method of claim 17, wherein the first seal is coupled to the first electrode, and wherein moving the first seal comprises moving the first electrode relative to the insulating cap.

19. The method of claim 12, wherein adjusting the gap between the first test head and the second test head comprises rotating at least one of the first electrode or the second electrode relative to the container.

20. A system for determining a dielectric breakdown voltage of a fluid sample, the system comprising:
 a dielectric fluid tester, comprising a container, a first electrode, comprising a first test head and protruding from outside of the container into the container, and a second electrode, comprising a second test head and protruding from outside of the container into the container, wherein the first test head and the second test head face each other and are separated by a gap, and wherein the first test head and the second test head are configured to determine the dielectric voltage breakdown of the fluid sample;
 a power supply, electrically coupled to each of the first electrode and the second electrode and configured to control a voltage applied between the first electrode and the second electrode; and
 a pressure-controlling source, fluidically coupled to an interior of the container and configured to control pressure inside the container.

* * * * *